(12) United States Patent
Albers (10) Patent No.: US 6,203,434 B1
(45) Date of Patent: Mar. 20, 2001

(54) CARDAN-TYPE JOINT INCLUDING SUPPORTIVE COMPRESSION BARS

(75) Inventor: Hartmut Albers, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/080,347

(22) Filed: May 18, 1998

Related U.S. Application Data (63) Continuation-in-part of application No. 09/080,251, filed on May 18, 1998.

(30) Foreign Application Priority Data

| May 17, 1997 | (DE) | 197 20 857 |
| May 17, 1997 | (DE) | 297 08 814 U |
| Jun. 27, 1997 | (DE) | 197 27 321 |

(51) Int. Cl.$^7$ .................................................. F16C 1/24
(52) U.S. Cl. ................................... 464/8; 464/69; 464/93
(58) Field of Search .......................... 464/55, 69, 93, 464/94, 95, 148, 8, 9

(56) References Cited

U.S. PATENT DOCUMENTS

| 1,316,903 | * | 9/1919 | Kuentzel | 464/69 |
| 1,588,424 | * | 6/1926 | Jencick | 464/94 |
| 2,532,755 | * | 12/1950 | Bloomfield | 464/69 X |
| 3,362,252 | * | 1/1968 | Ditlinger | 464/55 X |
| 3,759,064 | * | 9/1973 | Jorn et al. | 464/93 |
| 4,118,952 | | 10/1978 | Kobayashi . | |
| 4,790,794 | | 12/1988 | Takeda et al. . | |
| 4,873,889 | * | 10/1989 | Ditlinger | 464/69 X |
| 5,163,876 | * | 11/1992 | Zilberman et al. | 464/93 X |
| 5,195,930 | * | 3/1993 | Hirano et al. | 464/93 X |

FOREIGN PATENT DOCUMENTS

| 408277 | 1/1925 | (DE) . |
| 408277 | 11/1925 | (DE) . |
| 18 05 916 | 12/1957 | (DE) . |
| 1 040 854 | 10/1958 | (DE) . |
| 2 353 303 | 5/1974 | (DE) . |
| 37 34 089 A1 | 6/1988 | (DE) . |
| 4140311 | 6/1993 | (DE) . |
| 4304274 | 3/1994 | (DE) . |

(List continued on next page.)

OTHER PUBLICATIONS

Machinery's Handbook, 25th ed., New York, International Press, 1996, p. 2239. TJ151.M3 1996 C.1.*

Bussien: Automobiltechnisches Mandbuch, Berlin 14, Auflage, Verlag H. Cram, pp. 352 and 353, 1941.

"Taschenbuch für den Maschinenbau", W. Beitz et al., Dubbel, Springer–Verlag, Berlin, 1981, p. 313.

Primary Examiner—Lynne H. Browne
Assistant Examiner—Greg Binda
(74) Attorney, Agent, or Firm—Evenson, McKeown, Edwards & Lenahan, P.L.L.C.

(57) ABSTRACT

A joint for the angularly movable connection of two shafts with one another has flanges which are arranged on the shaft ends. Each of the flanges has three axially projecting driving pins which are connected with a hexagonal, elastically deformable joint ring. The joint ring, in turn, is formed in several parts by a collar of chain-link-type driving loops which can be swivelled on sockets at the corner points of the joint ring. For relieving the driving loops, one linear compression bar is also arranged in the interior of each driving loop. The compression bar has faces placed onto the sockets while transmitting force under load. The effective length of the compression bars is dimensioned such that the bars fill the clear space between two adjacent sockets only with play. The play is large enough so that the compression bars are placed in contact only after a defined basic load has been exceeded so that as the result of the load, the driving loops are elastically stretched to a defined degree.

18 Claims, 5 Drawing Sheets

FOREIGN PATENT DOCUMENTS

| | | |
|---|---|---|
| 2 410 172 | 6/1979 | (FR) . |
| 164895 * | 6/1921 | (GB) ..................................... 464/94 |
| 56-87632 | 12/1954 | (JP) . |
| 51-143158 | 12/1976 | (JP) . |
| 52-85534 | 7/1977 | (JP) . |
| 57-40135 | 3/1982 | (JP) . |
| 1-106565 | 4/1989 | (JP) . |
| 2-271112 | 11/1990 | (JP) . |

* cited by examiner

CARDAN-TYPE JOINT INCLUDING SUPPORTIVE COMPRESSION BARS

This application is a continuation-in-part of U.S. patent application Ser. No. 09/080,251, filed May 18, 1998.

BACKGROUND AND SUMMARY OF THE INVENTION

This application claims the priorities of German Application Nos. 197 20 857.6, filed May 17, 1997, 297 08 814.9, filed May 17, 1997, and 197 27 321.1, filed Jun. 27, 1997.

The present invention relates to a joint for torsion-proof connection of two shafts with one another such as the connection which is known, for example, from German Patent Document DE 43 04 274 C1.

When used in vehicles, joints of this type are severely stressed not only mechanically, by torque peaks and by overtensioning joint movements, but also thermally as a result of thermal conduction and heat radiation of very hot parts situated in the vicinity of the joints. In the case of plastic parts, the loadability of the materials used is reduced by the heating of the components so that the thermal stressing of the joints is also relevant to their mechanical loadability.

Many known joints, and particularly shafts of light-weight constructions, have respective flanges on the ends of the two shafts connected by the joint, which flanges have three driving pins axially projecting in the direction of the joint. In this case, six driving pins are arranged in a mutually staggered manner and are uniformly arranged on the circumference of a common graduated circle. The driving pins are connected with one another in a torsion-proof manner by a flexible hexagonal joint ring provided with sockets in its corner points. Between the sockets, the joint ring is itself axially elastically deformable so that the two flanges connected by the joint ring can carry out limited angular movements in any direction also during rotation. This angular movement axially undulates the joint ring so that within the scope of the elasticity, bending stresses occur corresponding to Hooke's law and are superimposed on the torque-caused operational stresses. As a result of this superimposition of stresses, the strength of the materials may be reached. Accordingly, because of the fatigue strength of the joints, only limited bending angles can be permitted.

Three driving pins per flange, resulting in a total of six driving pins in the joint, are not absolutely required. Using only two pins per flange, resulting in a total of four driving pins, is also conceivable. In this case, however, because of the distribution of the circumferential stress on the small number of driving pins, these driving pins are subjected to more stress than when a higher number of driving pins is used. The use of four or more pins per flange, resulting in a total of eight or more driving pins in the joint, is also conceivable. In this case, with the rising number of driving pins, the required joint diameter becomes larger and/or the tolerable bending angle becomes smaller. Therefore, three or six driving pins are frequently used as a compromise between stress on the components, on the one hand, and the joint size, on the other hand.

German Patent Document DE 41 40 311 A1 shows a hexagonal joint ring made of a fiber reinforced material in the form of a ring disk, in the case of which axial sockets are embedded in the reinforced corner areas. The linear areas between two adjacent corners are formed by a relatively thin web which extends in the plane of the ring disk and is made of several cohesive layers of hardened fiber reinforced material. This web is relatively wide in the radial direction. During bending of the joint, these webs are not only bent but also twisted. Although, in the case of relatively low bending stresses, the thin webs can be elastically bent, because the shape of the webs deviates considerably from rotational symmetry, during twisting of the webs, high tensions occur mainly at their interior and exterior edges.

The initially mentioned German Patent Document DE 43 04 274 C1 shows a hexagonal joint ring in which the sockets arranged in the corner areas are connected, in pairs, to one another by oval driving loops which themselves are closed and are wound on the outside around two adjacent sockets. Specifically, wide centrally located driving loops and a pair of driving loops situated on an edge side are alternately arranged in the joint ring. The wide driving loop is approximately three times as wide as its radial wall thickness; the two narrow driving loops together are approximately as wide as the driving loop situated in the center. The driving loops are radially swivellable on the sockets so that, as an individual component, the shape of the joint ring can be flexibly changed. For holding all parts of the joint ring together and for preventing the entry of dirt, the parts of the joint ring are embedded in a rubber-elastic mass of low hardness and are completely enclosed. Because the radial wall thickness is relatively narrow in relation to the axially measured width of the driving loops, they offer good prerequisites for absorbing circumferential tension when low excess tensions in the curvatures of the driving loops are present. However, during bending of this joint, the driving loops are tilted and also twisted, in which case high excess tensions occur at different points of the driving loops. During tilting, there is a one-sided edge support of the loop curvature on the socket which results in a concentration of tension at this location. During twisting of the relatively wide driving loops, in a manner similar to that of the webs of the joint disk according to German Patent Document DE 41 40 311 A1, excessive tensions occur at the edges although at a lower level than in the disk according to this document. Therefore, even under a moderate torque load, in operation, locally high tensions occur in the driving loops at least when noticeable bends of the joint reduce the nominal loading of the joint which can be tolerated over time.

It is an object of the invention to improve the joint of the above-mentioned type such that higher, durably reliable torque loads and/or bending angles can be permitted.

This object is achieved in joints according to the invention by a joint for torsion-proof connection of two shafts with one another which is axially and/or angularly movable within certain limits. The joint includes flanges which are, in each case, arranged at ends of the two shafts connected by the joint. Three driving pins axially project in the direction of the joint on each of the flanges to provide six mutually staggered driving pins uniformly arranged on a circumference of a common graduated circle. A flexible, regularly polygon-type, preferably hexagonal joint ring connects the driving pins with one another in a torsion-proof manner and is provided with sockets at corner points. The joint ring is axially elastically deformable between the sockets and is formed in several parts by a collar of several closed oval driving loops. Each of the loops winds around two adjacent sockets and can be radially swivelled on the sockets so that a shape of the joint ring can be changed in a flexible manner.

One linear compression bar is respectively mounted in an interior of each of the oval driving loops. The compression bar is provided on its two front ends at least indirectly with a supporting surface adapted to the sockets. Because of the compression bars in the interior of the receiving loops, a total of twice as many force transmission elements provide support in each loading direction as driving loops are provided for one rotating direction, respectively. In other words, as many force transmission elements are supportive as driving pins are contained in the joint. Specifically, each second driving loop in each loading direction is still supportive, but, in addition, the compression bars which are situated in-between and are arranged in the unloaded driving loops are also supportive. Because the force transmission elements are doubled, in comparison to the state of the art, a clearly higher nominal load of the joint can be durably permitted.

Further features and advantages of the invention will become clear. In addition, the invention will be described in connection with certain embodiments which are illustrated in the drawings.

DESCRIPTION OF THE PREFERRED EMBODIMENTS

Figure 1:
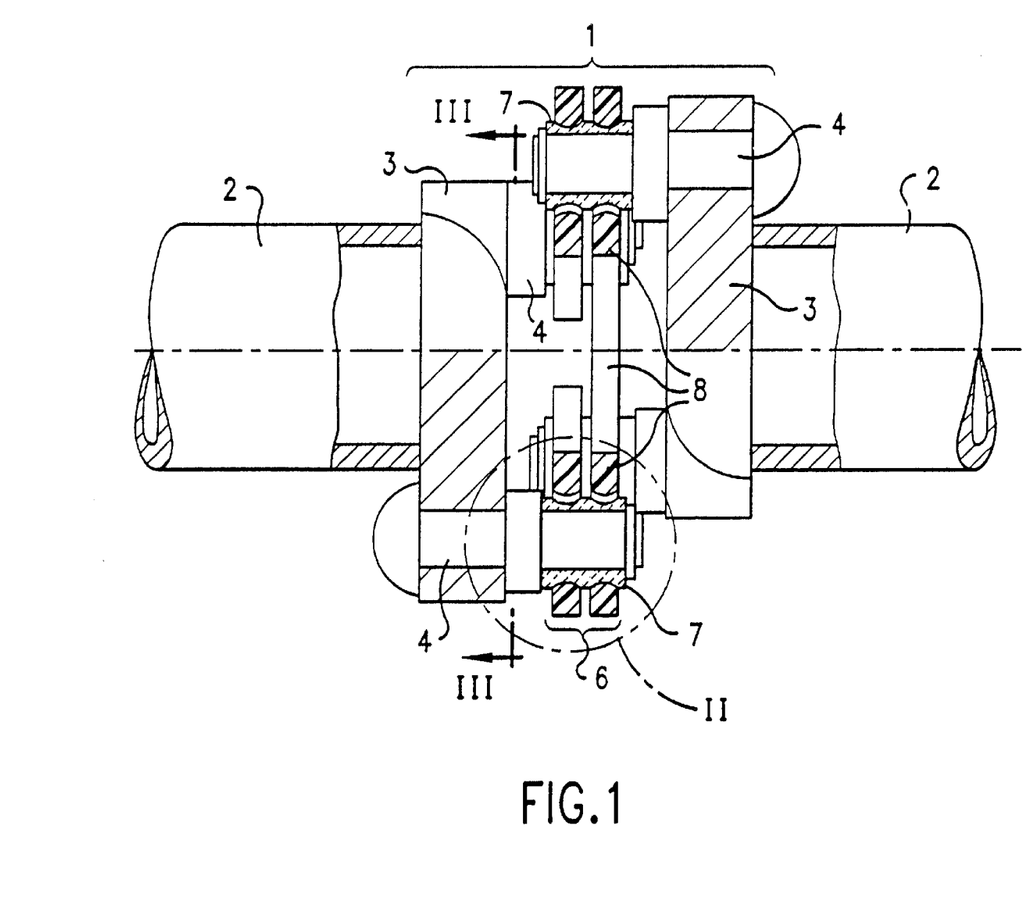
FIG. 1 is a lateral sectional view of a shaft according to the invention.
Figure 2:
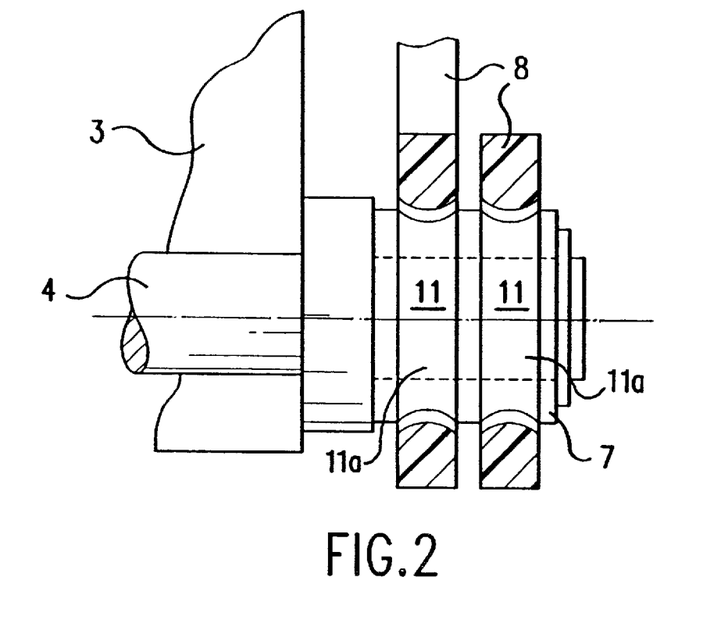
FIG. 2 is an enlarged representation of that portion of the shaft in an area II of FIG. 1.
Figure 3:
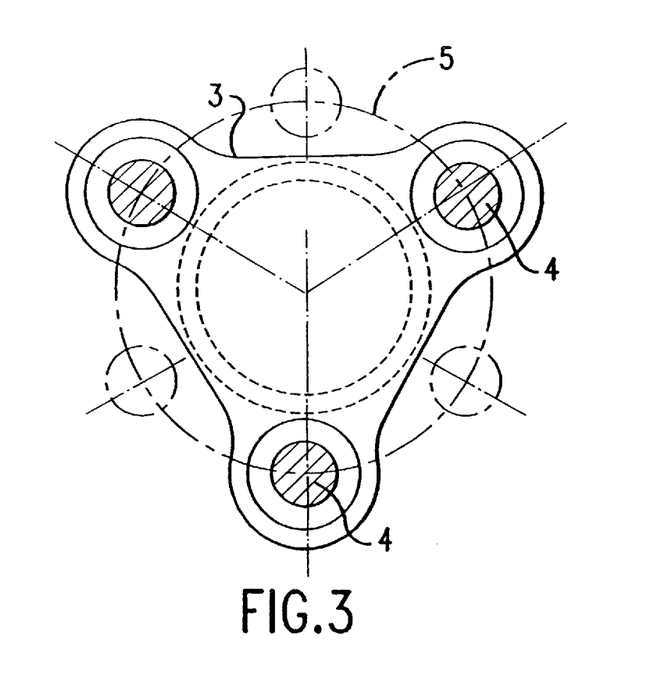
FIG. 3 is an axial view of the shaft flange of the shaft illustrated in FIG. 1 along a section line III—III.
Figures 4, 5:
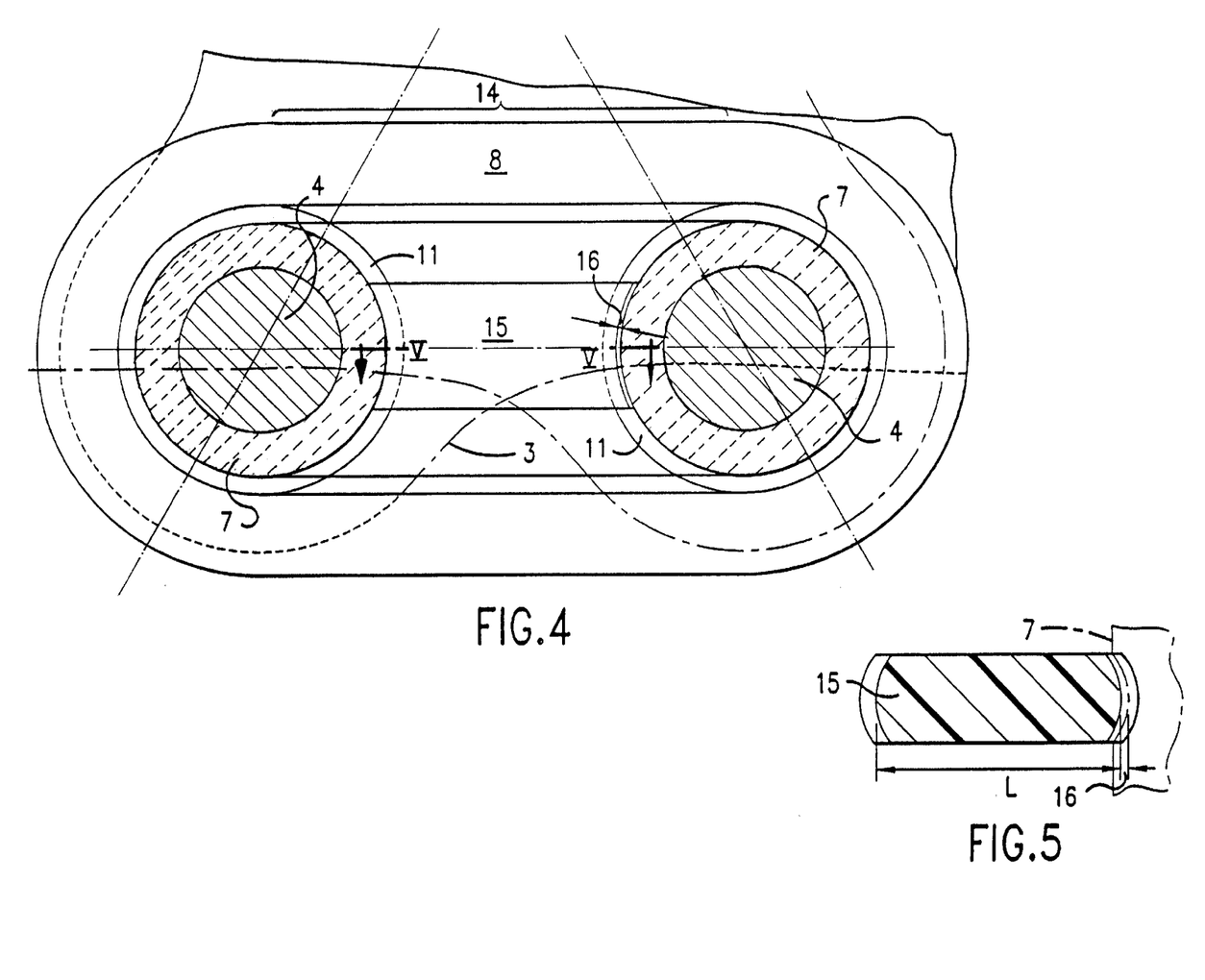
FIG. 4 is an enlarged axial view of a driving loop of the joint according to FIG. 1 in the installed condition, including an inserted compression bar or rod.
FIG. 5 is a view of the compression bar of FIG. 4 along section line V—V of FIG. 4.
Figure 6:
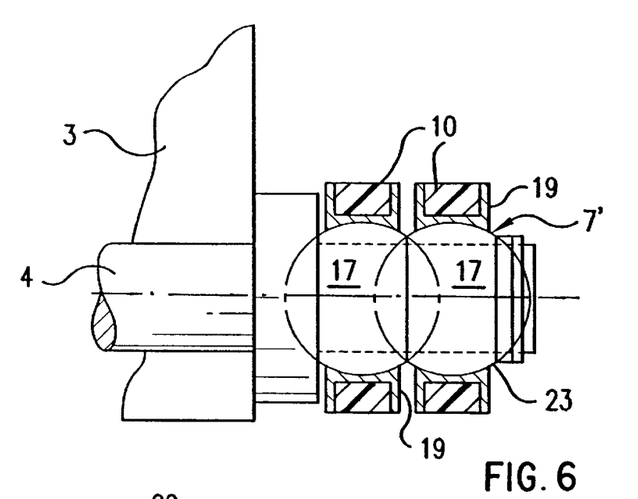
FIG. 6 is an enlarged representation similar to the representation according to FIG. 2 but of a modified joint with a spherical-surface-shaped circumferential elevation on the socket.

It will first be pointed out what the two embodiments according to FIGS. 1 to 5, on the one hand, and FIGS. 6 to 9, on the other hand, have in common. Both embodiments are based on the representation according to FIG. 1. This figure shows a joint 1 by which two shafts 2 can be connected with one another in a torsion-proof manner but axially and/or angularly movable within certain limits. One flange 3 respectively is arranged at each of the ends of the two shafts connected by the joint. In the illustrated embodiment, each flange carries three driving pins 4 which project axially in the direction of the joint. A total of six driving pins, which are mutually staggered, is uniformly arranged on the circumference of a common graduated circle 5. As illustrated more clearly in FIG. 3, the flanges are recessed in the circumferential area situated between the driving pins and therefore, in principle, have a "star-shaped" construction. Because opposite flanges with mutually staggered arms have this star-shaped construction, during angular movements, the flanges can dip into one another, resulting in a larger angular mobility of the joint. The driving pins 4 on the ends of the flange arms are alternately connected with one another in a torsion-proof manner by a flexible, regular polygon-type, preferably hexagonal joint ring 6 which is provided with sockets 7, 7' in the corner points. The legs of the joint ring situated between the sockets can be elastically axially deformed and twisted in one another. The joint ring, in turn, is constructed in several parts and is composed of a collar of several closed oval driving loops 8, 10, 10', each of which winds around two adjacent sockets 7 and 7 or 7' and 7', respectively, in the manner of individual chain links which can each be radially swivelled on the sockets so that the shape of the joint ring 6 can be flexibly changed. The individual driving loops, however, are stressed by axial bending and twisting of the individual driving loops, by torque-caused tensile loads, by axial tilting and by twisting. As a result, the overall load which can be tolerated by the joint must be set to be correspondingly lower. Each oval driving loop 8 has flattened sides 14 as shown in FIG. 4.

In order to be able to easily bend the joint relatively extensively during rotation, the driving loops 8, 10 are axially swivellably disposed on the sockets 7, 7'. For this purpose, the oval driving loops are indirectly or directly disposed on the driving pin 4 through a pair of contact surfaces, which are round in their meridian sections, on the socket or on the driving loop. In the embodiment illustrated in FIGS. 1 to 5, one circumferential groove 11, respectively, which has a circular-arc-shaped cross-section, is provided on the exterior side of the sockets, into which circumferential groove 11 one of the driving loops 8, which is rounded on the interior side, engages. As a result, the driving loops 8 can be axially swivelled in the respective pertaining circumferential grooves 11 while the loop cross-sections carry out axial sliding movements. In the embodiment according to FIGS. 6 to 9, a circumferential elevation 17, with a spherical shape 23, is provided on the socket 7'. The driving loops 10, 10', which have flat cross-sections, are indirectly disposed on the elevations 17 by way of sliding elements 19 or 20, each of which has a hollow spherical surface 24 on the interior side.

The driving loops 8, 10 as well as the compression bars 15, 15', which will be described in detail, are expediently made of a long-fiber-reinforced synthetic material, in which case the long fibers are all disposed in parallel to one another and to the course of the supportive cross-section. The fibers run through the loops and bars without interruptions. During rotation of the joint in the bent condition, the driving loops 8, 10, 10' and the compression bars 15, 15' carry out a complete pendulum movement in the axial direction during each rotation, in which case the circular-arc-contoured contact surfaces axially slide on one another. In order to avoid wear during this sliding movement, particles of a solid lubricant are mixed into the fiber material and/or the synthetic matrix material of the driving loops 8, 10 and of the compression bars 15.

The driving loops 8 and 10, 10', the compression bars 15, 15' and the sockets 7, 7' are all subjected to a tribological stress. In order to minimize wear, the sockets are made of a low-friction and wear-resistant material, preferably a ceramic material. It may also be advantageous for particles of a solid lubricant to be mixed into the ceramic material of the socket.

Figure 9:
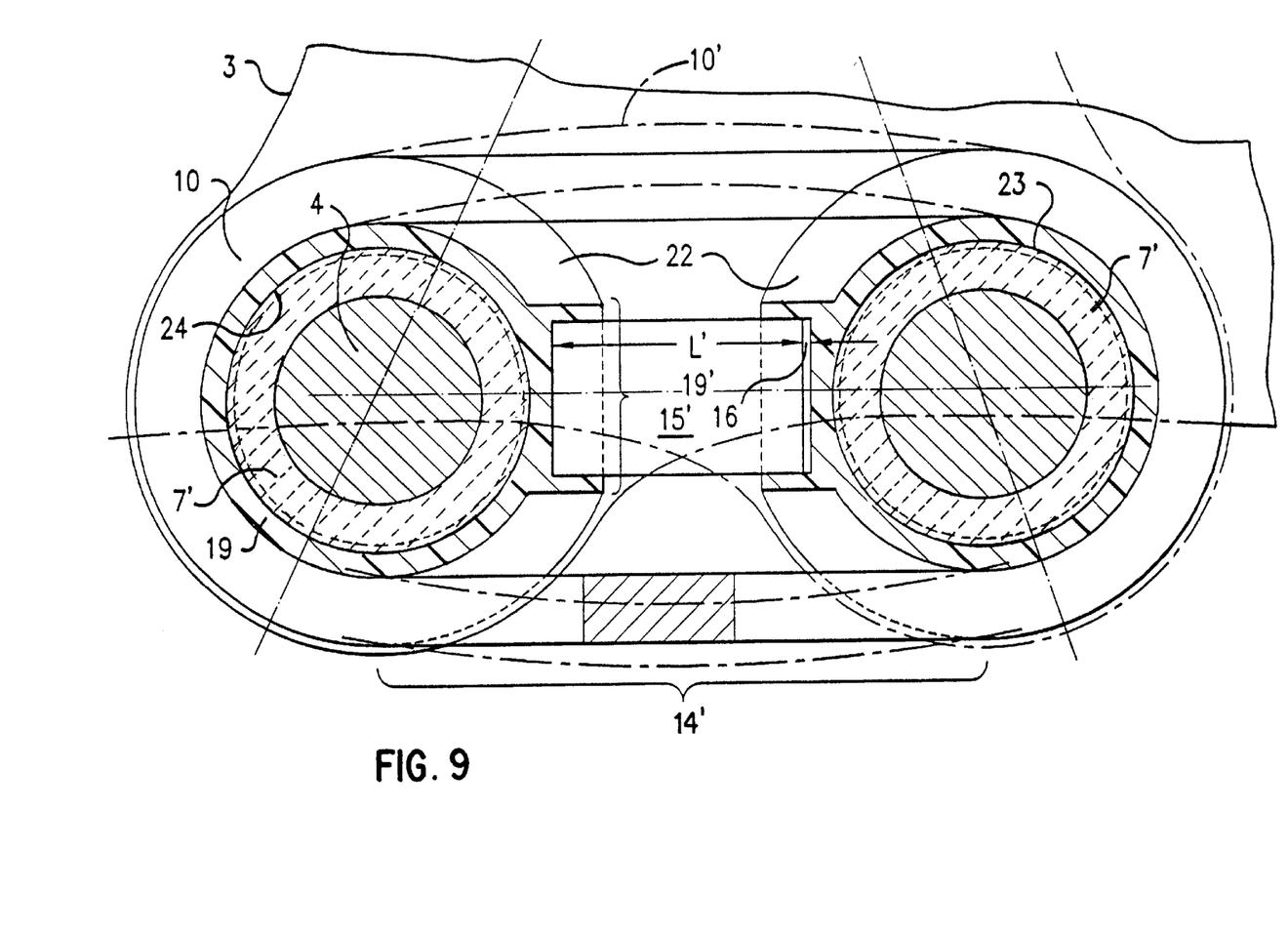
FIG. 9 is a sectional view similar to FIG. 4 but of the joint according to FIG. 6 as seen in an axial direction in the installed condition including the inserted compression rod.

In order to optimize the driving loops with respect to a thrust-type load, it is expedient according to the representation in FIG. 9 indicated by a dash-dotted line to construct the flattened sides 14' of the oval of the driving loops 8' in a curved manner. As a result, when a tensile load is exercised on the driving loop, the curved flat sides can stretch elastically in the direction of a straight line and with respect to time can reduce the tension peak. It is also conceivable to arch the flat sides into the interior of the oval which would also cause this effect. However, for better producibility of the driving loops from an endless-fiber-reinforced synthetic material by winding techniques, it is more expedient for the curved flat sides 14' of the oval to be curved convexly to the outside. Naturally, the oval shaping can easily also be implemented in the embodiment according to FIGS. 1 to 5.

Although a total of six driving loops 8 is mounted in the joint, in any rotating direction, in each case only half the number of driving loops contribute to the torque transmission. In order to relieve the driving loops, one linear compression bar 15, 15' is respectively mounted in the interior of each driving loop 8, 10, 10'. In the embodiment according to FIGS. 1 to 5, the faces of the pressure bar 15 also engage in the circumferential grooves 11 of the sockets 7 in a force-transmitting manner. For this purpose, the compression bar 15 is provided on its two faces with a saddle surface which is adapted with respect to the cross-section as well as with respect to the circumferential course of the circumferential groove of the sockets. Each of the two ends of the compression bar engages in the circumferential groove 11 of one adjoining socket 7 respectively. The compression bars are therefore directly form-lockingly secured in the axial direction on the sockets against sliding away. When the joint is loaded by torque in a defined rotating direction, each second driving loop and the three compression bars arranged in the interiors of the unloaded driving loops will then participate in the transmission of the torque. By this distribution of the load to a number of force transmitting elements which is twice as high as in the state of the art, the force transmitting elements in the joint are clearly relieved.

Under normal load conditions of the joint, the three driving loops of one rotating direction alone are easily capable of transmitting the occurring torque so that the compression bars do not normally have to be loaded. In addition, for reasons of a static uncertainty, it is possible to uniformly distribute a torque to only three rather than to six force transmitting elements of a circle. It is therefore expedient to dimension the length L of the compression bars 15 such that they fill the clear space between the adjacent sockets 7 only with play 16 (FIG. 4). As a result, the compression bars have an effect only after a certain load-caused elastic lengthening of the driving loops and will only then also absorb load. Accordingly, the play 16 of the compression bars between two adjacent sockets is dimensioned as large as the load-caused lengthening of the driving loops under a tensile load which, although it is very high, can be tolerated over time. Only when the torque load leads to a higher tensile load on the driving loops and stretches these still more are the front ends of the compression bars placed in a force-transmitting manner onto the tread 11a of the circumferential grooves 11 of the sockets. An elastic driving loop 10' which is constructed with convex flat sides 14' will naturally stretch more under a load than that with linear flat sides so that, in the case of the elastic driving loops 10', the play has to be designed larger than in the case of driving loops with linear flat sides.

Another embodiment according to FIGS. 6 to 9 will now be discussed. In this embodiment a circular-arc-shaped contact surface 24, which viewed from the interior has a concave cross-section, is provided on a sliding element 19, 20. A convex circumferential elevation 17 is mounted on the socket 7'. In the embodiment according to FIGS. 6 to 9, the driving loop is disposed on the socket indirectly by sliding elements 19, 20 which has the advantage that the material of the sliding elements can be optimally selected and fixed according to tribological aspects.

When spherical contact surfaces 23, 24 are used between the socket and the sliding element or the driving loop, because of the flatter arching of the spherical surface, it is more difficult to center a compression bar 15' in a secure position on the spherical surface. This is particularly true when, as recommended, the compression bar is held with play between the driving pins. Therefore, at least in the case of contact surfaces which are convex to the outside, and particularly spherical, it is expedient to place the compression bars indirectly upon the circumferential elevations 17 by using sliding blocks 19' and 21 made of a slidable material, and particularly a plastic material. On the faces, the compression bars 15' are cut in a linear and rectangular manner to the defined length L' and by their ends are fitted into the sliding blocks 19', 21. Together with the compression bars, the sliding blocks form the operating length of the compression bars.

Figures 7, 8:
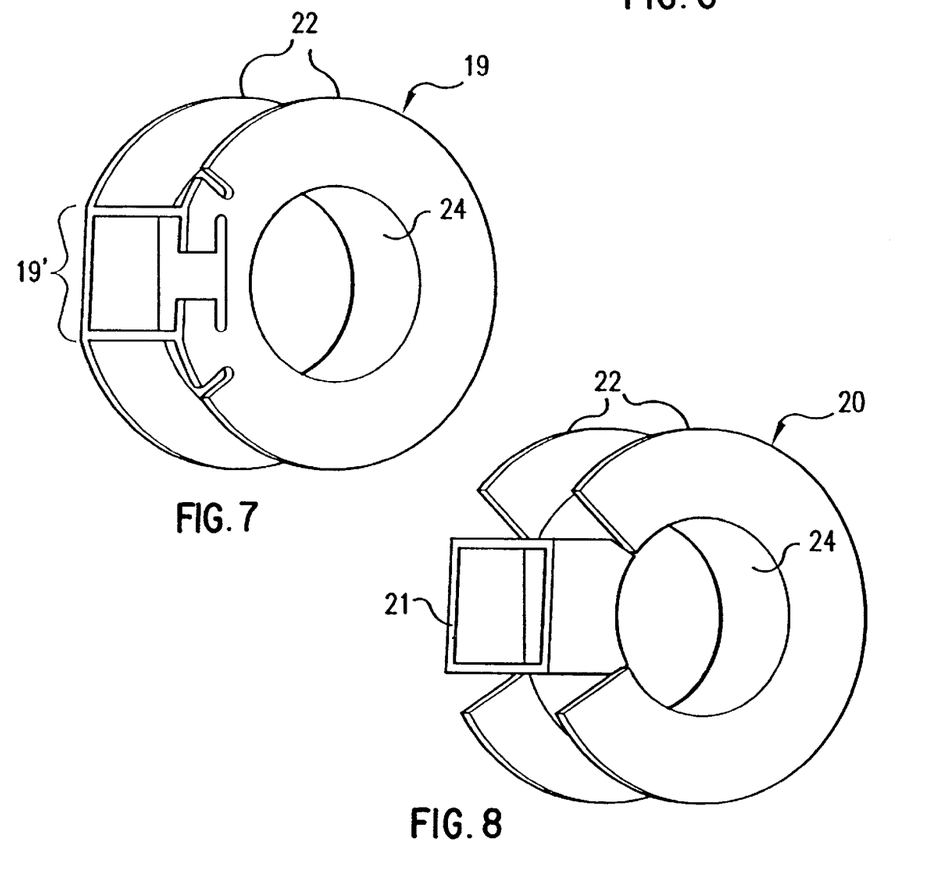
FIG. 7 is an enlarged perspective individual representation of a sliding element with an integrated sliding block for a compression bar for the joint according to FIG. 6.
FIG. 8 is a view of a modified form of the sliding element according to FIG. 7, in which the sliding element for the driving loop and the sliding block for the compression bar are constructionally separated from one another.

In the embodiment of the sliding element 19 according to FIG. 7, the sliding block 19' for the compression bar 15' is constructionally integrated into the sliding element 19 to form a component which is closed in a ring shape. The driving loop 10 is first placed on the outside onto the two sliding elements in each case between the guiding rims 22 which determines the mutual spacing of the two opposite sliding elements. The sliding elements were expediently previously axially snapped onto the spherical circumferential elevations 17 of the sockets 7'. In order to then be able to enter the ends of the compression bar 15' into the sliding blocks, an axially exposed wall of the sliding block has a slotted construction so that, while this wall is elastically bent open, the compression bar end can be axially inserted into the sliding block.

In the further development of the sliding element 20 according to FIG. 8, this sliding element 20 has a C-shaped construction, and is open at one circumferential point. The sliding block 21 for the compression bar 15' is designed as a separate component with respect to the sliding element (20). The driving loop with the two pertaining sliding elements 20 and sockets 7', on the one hand, and the compression bar 15' with the two sliding blocks 21, on the other hand, can each be preassembled separately. The latter preassembled units can then be pushed axially between the circumferential elevations 17 of the socket, in which case the intended play 16 mentioned above promotes the snap-in operation.

For protecting the sliding points from entry of dirt and for holding the component parts of the joint ring 6 together to form a workpiece which is closed in itself and can be handled, all parts of the joint ring are embedded in a rubber elastic mass of a low hardness and are completely enclosed by this mass.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A joint for connection of two shafts with one another which is axially and/or angularly movable within certain limits comprising:

flanges which are, in each case, arranged at ends of the two shafts connected by the joint, three driving pins axially projecting in the direction of the joint on each of the flanges to provide six mutually staggered driving pins uniformly arranged on a circumference of a common graduated circle, a flexible, regularly polygon-type, joint ring which connects the driving pins with one another, and which is provided with sockets at corner points, said joint ring being axially elastically deformable between the sockets, the joint ring, in turn, being formed in several parts by several closed oval driving loops, each winding around two adjacent sockets, and each of which can be radially swivelled on the sockets so that a shape of the joint ring can be changed in a flexible manner, and one linear compression bar respectively mounted in an interior of each of the oval driving loops, said compression bar being provided on two ends thereof with a supporting surface adapted to the sockets, wherein each compression bar absorbs load only after a load-caused elastic lengthening of a plurality of said driving loops.

2. The joint according to claim 1, wherein the compression bars are form-lockingly centered on the sockets and secured against sliding away axially and peripherally despite the relative sliding movement in both directions, both in a circumferential direction and in an axial direction.

3. The joint according to claim 1, wherein the supporting surfaces of each compression bar are engageable with adjacent sockets by way of sliding blocks fitted on the ends of the compression bars which are linearly and rectangularly cut to a defined length, said sliding blocks being made of a slidable plastic material, and together with the compression bars forming operating lengths of the compression bars.

4. The joint according to claim 3, and further comprising particles of a solid lubricant mixed into the material of said sliding blocks.

5. The joint according to claim 3, wherein an effective length of the compression bars and said sliding blocks is dimensioned such that the compression bars fill a clear space between two adjacent sockets with play.

6. The joint according to claim 1, wherein each of the compression bars is made of a long-fiber-reinforced synthetic material, the long fibers all extending parallel to one another, extending parallel to the longitudinal axis of the compression bars, and running through the compression bars without interruptions.

7. The joint according to claim 1, and further comprising particles of a solid lubricant mixed into the material of the compression bars.

8. The joint according to claim 7, wherein the particles are mixed into fiber material of the compression bars.

9. The joint according to claim 7, wherein the particles are mixed into synthetic matrix material of the compression bars.

10. A joint for connection of two shafts with one another which is axially and/or angularly movable within certain limits comprising:

flanges which are, in each case, arranged at ends of the two shafts connected by the joint, three driving pins axially projecting in the direction of the joint on each of the flanges to provide six mutually staggered driving pins uniformly arranged on a circumference of a common graduated circle, a flexible, regularly polygon-type, joint ring which connects the driving pins with one another, and which is provided with sockets at corner points, said joint ring being axially elastically deformable between the sockets, the joint ring, in turn, being formed in several parts by several closed oval driving loops, each winding around two adjacent sockets, and each of which can be radially swivelled on the sockets so that a shape of the joint ring can be changed in a flexible manner, and one linear compression bar respectively mounted in an interior of each of the oval driving loops, said compression bar being provided on two ends thereof with a supporting surface adapted to the sockets, wherein an effective length of the compression bars is dimensioned such that the compression bars fill a clear space between two adjacent sockets with play.

11. The joint according to claim 10, wherein the play is dimensioned so that, when the joint is subjected to torque loading, the compression bars are not placed onto treads of circumferential grooves of the sockets before the driving loops are already loaded by the torque loading to a defined circumferential force and are elastically stretched in the circumferential direction.

12. The joint according to claim 10, wherein the play is dimensioned so that, when the joint is subjected to torque loading, the compression bars are not placed on a surface of a circumferential elevation of the sockets before the driving loops are already loaded by the torque loading to a defined circumferential force and are elastically stretched in the circumferential direction.

13. A joint for flexible connection of two shafts with one another comprising:

flanges arranged at ends of the shafts connected by the joint, a plurality of driving pins projecting from each of the flanges to provide mutually staggered driving pins uniformly arranged on a circumference of a common graduated circle, a flexible polygonal joint ring which connects the driving pins with one another by sockets received by the pins at corner points, said joint ring being axially elastically deformable between the sockets, the joint ring being formed by closed oval driving loops, each of said loops winding around two adjacent sockets and radially swivelling on the sockets as a shape of the joint ring is changed, and a compression bar respectively mounted within each of the oval driving loops, said compression bar being provided on opposite ends thereof with supporting surfaces engageable with the adjacent sockets, wherein each compression bar absorbs load only after a load-caused elastic lengthening of a plurality of said driving loops.

14. The joint according to claim 13, wherein the supporting surfaces of each compression bar are engageable with the adjacent sockets by way of sliding blocks fitted on the opposite ends of the compression bars.

15. The joint according to claim 14, and further comprising particles of a solid lubricant mixed into material of said sliding blocks.

16. The joint according to claim 13, wherein each of the compression bars is made of a fiber-reinforced synthetic material.

17. The joint according to claim 13, and further comprising particles of a solid lubricant mixed into the material of the compression bars.

18. A joint for flexible connection of two shafts with one another comprising:

flanges arranged at ends of the shafts connected by the joint, a plurality of driving pins projecting from each of the flanges to provide mutually staggered driving pins uniformly arranged on a circumference of a common graduated circle, a flexible polygonal joint ring which connects the driving pins with one another by sockets received by the pins at corner points, said joint ring being axially elastically deformable between the sockets, the joint ring being formed by closed oval driving loops, each of said loops winding around two adjacent sockets and radially swivelling on the sockets as a shape of the joint ring is changed, and a compression bar respectively mounted within each of the oval driving loops, said compression bar being provided on opposite ends thereof with supporting surfaces engageable with the adjacent sockets, wherein play is provided between said compression bar and at least one of said adjacent sockets.

* * * * *